Figure 1:
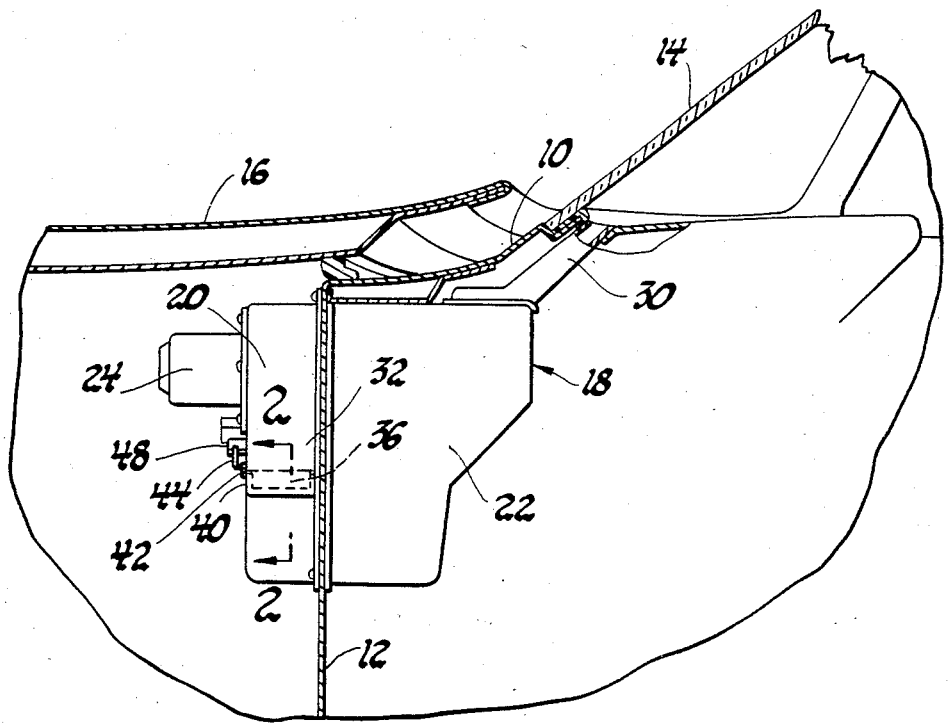

United States Patent [19]

Miller

[11] Patent Number: 4,588,351
[45] Date of Patent: May 13, 1986

[54] CENTRIFUGAL-TYPE AIR BLOWER BLEED-OFF ARRANGEMENT

[75] Inventor: Larry D. Miller, Rochester, Mich.

[73] Assignee: General Motors Corporation, Detroit, Mich.

[21] Appl. No.: 652,719

[22] Filed: Sep. 21, 1984

[51] Int. Cl.⁴ ............................................. F01B 25/00
[52] U.S. Cl. .................................. 415/47; 415/121 A; 415/168; 98/2.01; 98/2.09
[58] Field of Search ............. 415/47, 121 A, 168; 98/2.01, 2, 2.08, 2.09, 2.17, 2.19; 236/49

[56] References Cited

U.S. PATENT DOCUMENTS 1,643,966 10/1927 Swartwout .......................... 98/2.17
2,696,345 12/1954 Hopper ................................. 415/47
4,047,912 9/1977 Markland ........................... 415/168
4,223,754 9/1980 Mizuno et al. ..................... 98/2.09
4,346,860 8/1982 Tedstone ......................... 60/39.092

FOREIGN PATENT DOCUMENTS 33011 2/1982 Japan ................................... 98/2.01
197712 12/1977 U.S.S.R. .............................. 98/2.17

Primary Examiner—Carlton R. Croyle
Assistant Examiner—Donald E. Stout
Attorney, Agent, or Firm—R. L. Phillips

[57] ABSTRACT

A centrifugal-type air blower for a vehicle occupant compartment that operates in a housing and during a defrost mode to deliver heated air to defrost the vehicle's windshield is provided with an automatic bleed-off valve arrangement that automatically exhausts from the blower housing to outside the vehicle any airborne particles such as snow and water centrifugally discharged by the blower in the defrost mode when the outside air temperature falls below a predetermined sub-freezing water temperature.

1 Claim, 2 Drawing Figures

U.S. Patent     May 13, 1986     4,588,351

CENTRIFUGAL-TYPE AIR BLOWER BLEED-OFF ARRANGEMENT

TECHNICAL FIELD

This invention relates to a centrifugal-type air blower for a motor vehicle occupant compartment and more particularly to a bleed-off valve arrangement therefor for ridding the air from the blower of foreign particles.

BACKGROUND OF THE INVENTION

In motor vehicles employing a centrifugal-type air blower in the air system for the vehicle's occupant compartment, those foreign particles heavier than air such as snow, water and dirt drawn into the system from the outside tend to gravitate radially outward toward the outside wall of the blower's scroll housing and unless prevented could be borne by the air onto the windshield in the defrost mode. Normally, this is prevented in the system ducting by employing a large intervening plenum between the blower and the windshield to trap such airborne particles. But the space such plenum requires can be difficult to allocate without intruding on other needed space particularly with the downsizing of passenger cars.

SUMMARY OF THE INVENTION

The present invention eliminates the need for such a plenum and its attendant space requirement by the provision of a bleed-off valve which operates automatically to exhaust from the blower housing to outside the vehicle any airborne particles such as snow and water centrifugally discharged by the blower in the defrost mode when the outside air temperature falls below a predetermined subfreezing water temperature.

These and other objects, advantages and features of the present invention will become more apparent from the following description and drawing in which:

DRAWING AND DESCRIPTION OF PREFERRED EMBODIMENT

Figure 2:
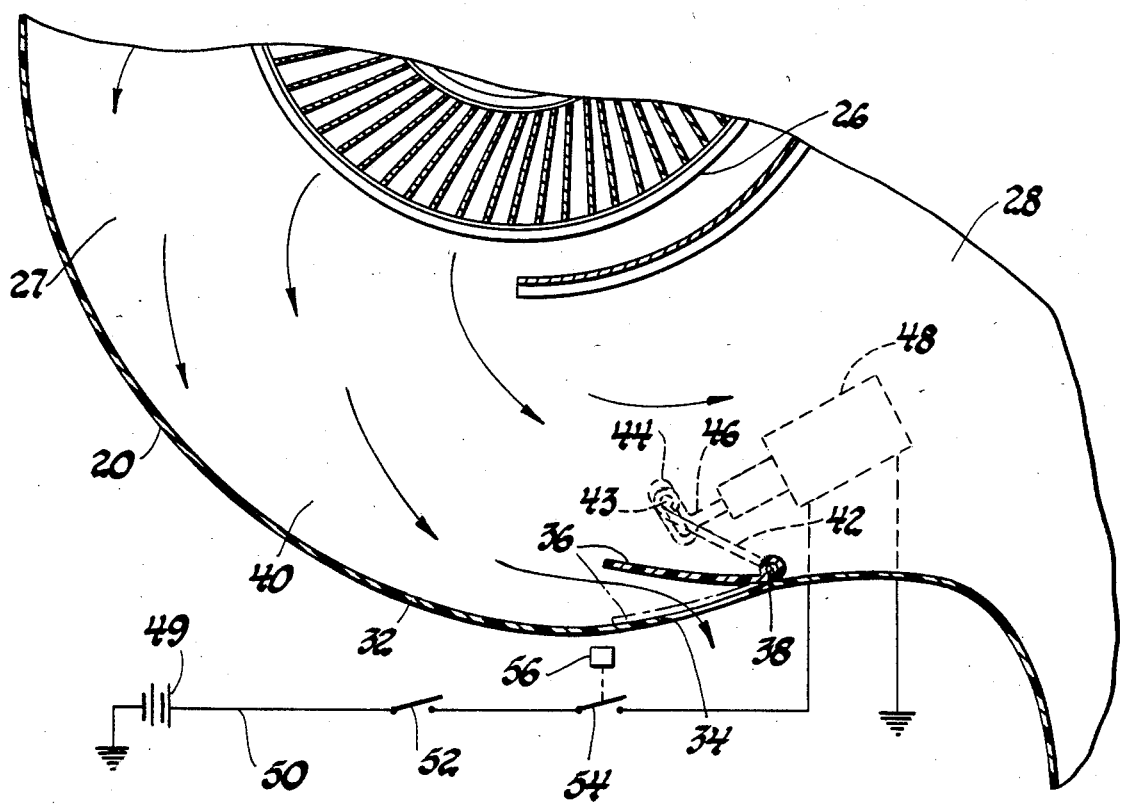

FIG. 1 is a partial side elevational view with parts broken away of a passenger car having the preferred embodiment of the centrifugal-type air blower with bleed-off valve of the present invention installed therein; and FIG. 2 is an enlarged view taken along the line 2—2 in FIG. 1 and further showing in schematic form the control system for the bleed-off valve.

Referring to FIG. 1, there is shown a passenger car with a typical body 10 including firewall 12, and a windshield 14 mounted on the body rearward of both the firewall and a front hood 16 which, of course, is hinge mounted on the body. An air conditioning, heating and ventilation system unit 18 is mounted on the firewall 12 and includes a blower case or housing 20 mounted on the forward side of the firewall and a system's component case 22 including ducting mounted on the rearward or occupant side of the firewall. The system 18 has a centrifugal-type blower which is driven by a motor 24 mounted on the blower housing 20 and has an impeller 26 as shown in FIG. 2 which operates within a scroll shaped section 27 of the housing 20 to deliver air to a discharge duct 28 in the housing where during the defrost mode of the system heated air is delivered to the interior side of the windshield 14 by defrost ducts 30 (only one being shown).

The parts thus far described are conventional and operate in a well known manner. As such, it is important to know that as air from the outside is drawn into the blower impeller 26 and rotates around the scroll section, particles heavier than air such as snow, water and dirt will tend to gravitate outward toward the outer wall 32 of the blower's scroll housing 27.

According to the present invention, the scroll housing 27 is provided at its exit to the air delivery duct 28 with a valved bleed-off port 34 in the scroll housing's outside wall 32 along which such foreign particles tend to collect. Opening and closing of the bleed-off port 34 is provided by a flapper-type valve 36 that is pivotally mounted on the inside of the scroll housing's outside wall 32 with a hinge pin 38. The hinge pin 38 is fixed to the valve 36 and extends outward through the sidewall 40 of the scroll housing and has integrally formed therewith a lever arm 42 to pivot the valve 36. The valve's lever arm 42 is in turn connected by a pin 43 to a transverse slotted end 44 of a translatable rod 46 operated by a DC electric motor 48 that is externally mounted on the scroll housing's sidewall 40.

Further is accordance with the present invention, the valve motor 48 is controlled to open the bleed-off valve 36 only when the operator selects the defrost mode to direct air to defrost the windshield 14 and when the outside air temperature is at or below a sub-freezing water temperature, (for example 15° F.). To this end, the motor is provided with a control circuit wherein the car battery 49 is utilized as the power supply and is connected to the grounded motor by a power supply line 50 in which is included what will be referred to as a mode switch 52 and a thermal switch 54. The mode switch 52 is coupled with the normal air conditioning heating and ventilation controls such that when a vehicle occupant selects the defrost mode, this switch 52 is conjointly closed. The thermal switch 54, on the other hand, has a temperature responsive actuator 56 such as a wax power element or bimetallic element so as to operate independently according to temperature and is calibrated to close at an outside sub-freezing air temperature such as between 10°–15° F. Moreover, it will be understood that the thermal switch actuator 56 is suitably located such as in the fresh air intake to the system so as to sense such outside air temperature.

Describing now a typical operation of the above bleed-off valve with the blower in operation, outside air is drawn in by the impeller 26 and any foreign particles such as snow, water and dirt will be borne by the air as it travels in the direction of the arrows in FIG. 2 from the impeller and tend to gravitate radially outward toward the outer wall 32 of the scroll housing. Assuming cold weather conditions where the outside air temperature falls below 15° F., the thermal switch 54 will then close so that when the operator then selects the defrost mode and thereby closes the mode switch 52, the valve motor 48 operates to open the bleed-off valve 36. As a result, any airborne foreign particles tending to gravitate toward the outside wall 32 will be borne by the air out through the then open bleed-off port 34 in the scroll housing and be exhausted to outside the vehicle forward of the firewall 12. And thus with the bleed-off valve opening automatically in the defrost mode the amount of frost forming on the windshield is substantially reduced because of the elimination of such foreign particles as snow and water.

Furthermore, it will be appreciated that the bleed-off valve utilizes heretofore unused space and requires only simple modification of the scroll housing in eliminating the normally required large plenum to rid the blower air of the foreign particles, so that they can not be deposited on the windshield. Furthermore, rather than allowing such foreign particles to collect and then have to be drained from a plenum in the air ducting, they are immediately exhausted back to atmosphere to help maintain a clean air delivery system to the occupant compartment. Moreover, because the system operates automatically, there is no need for the operator to be concerned with additional manual control functions in helping to maintain the windshield free of foreign matter.

It will also be understood by those skilled in the art that the above-described preferred embodiment is illustrative of the invention which may be modified within the scope of the appended claims.

The embodiments of the invention in which an exclusive property or privilege is claimed are defined as follows:

1. A vehicle defrost system for delivering heated air to a vehicle windsheild, said system including a centrifugal air blower having an impeller, a scroll-type blower housing having a fluid flow path therein, and a discharge duct, the improvement comprising:

an automatic bleed-off valve means, including a valve positioned in an outer wall of said blower housing and having a flap disposed to extend into said fluid flow path when said valve is open, and disposed to be substantially flush with said outer wall of the blower housing when said valve is closed, an electric motor operative to move said flap in the range between said extended position and said substantially flush position, thereby opening and closing said valve, and a control means for said motor, including a mode switch and a thermal switch, said mode switch being activated when a defrost mode is manually selected, said thermal switch being activated when outside temperature falls below a pre-determined sub-freezing value, said control means being actuated to extend said flap only when both of said switches are activated.

* * * * *